Figure 1:
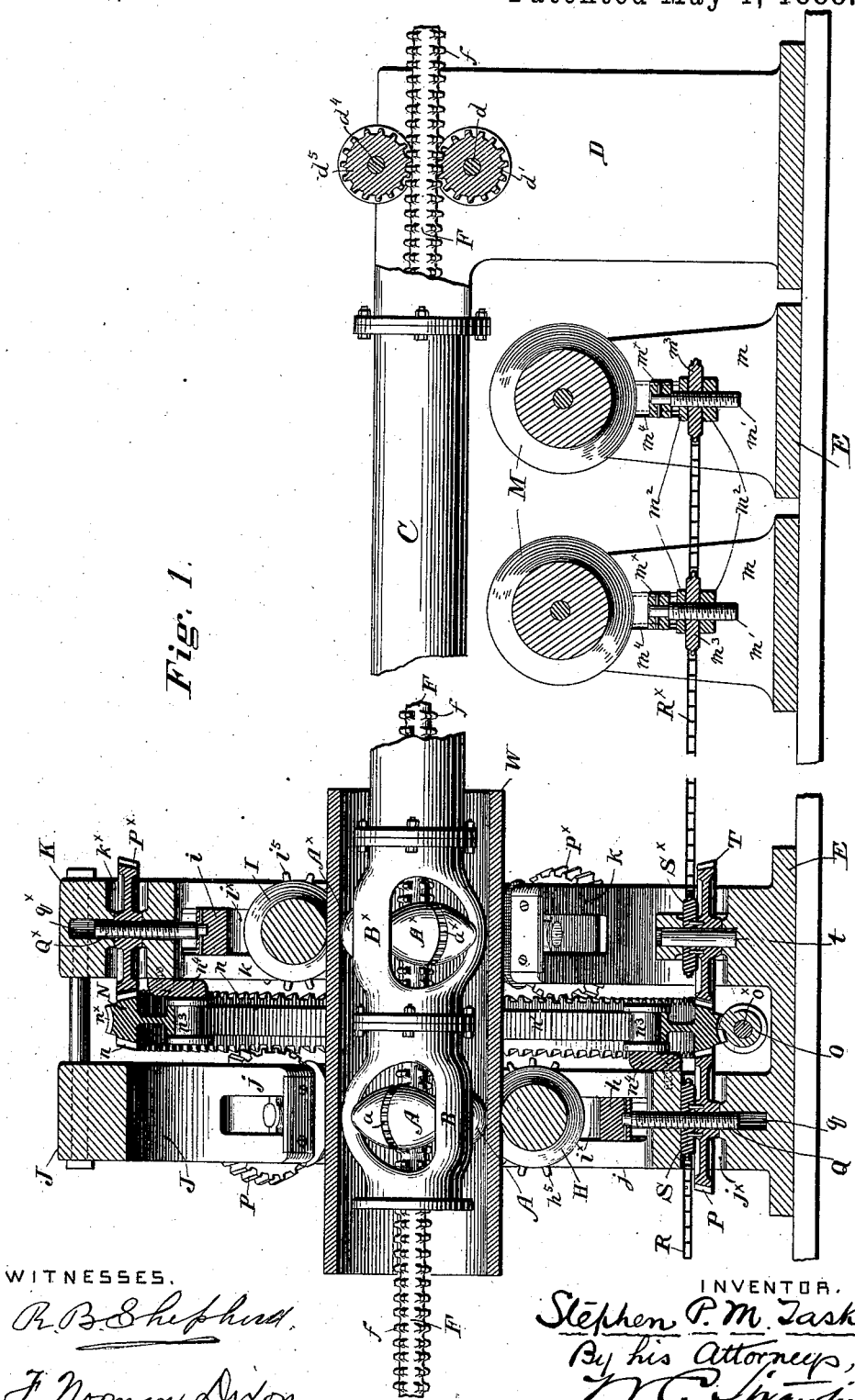

(No Model.) 6 Sheets—Sheet 1.

S. P. M. TASKER.
ROLLING MILL FOR MAKING TUBES.

No. 382,017. Patented May 1, 1888.

WITNESSES.
R. B. Shepherd
F. Norman Dixon.

INVENTOR.
Stephen P. M. Tasker
By his Attorneys,
N. C. Strawbridge
J. Bonsall Taylor.

(No Model.) 6 Sheets—Sheet 2.
S. P. M. TASKER.
ROLLING MILL FOR MAKING TUBES.
No. 382,017. Patented May 1, 1888.
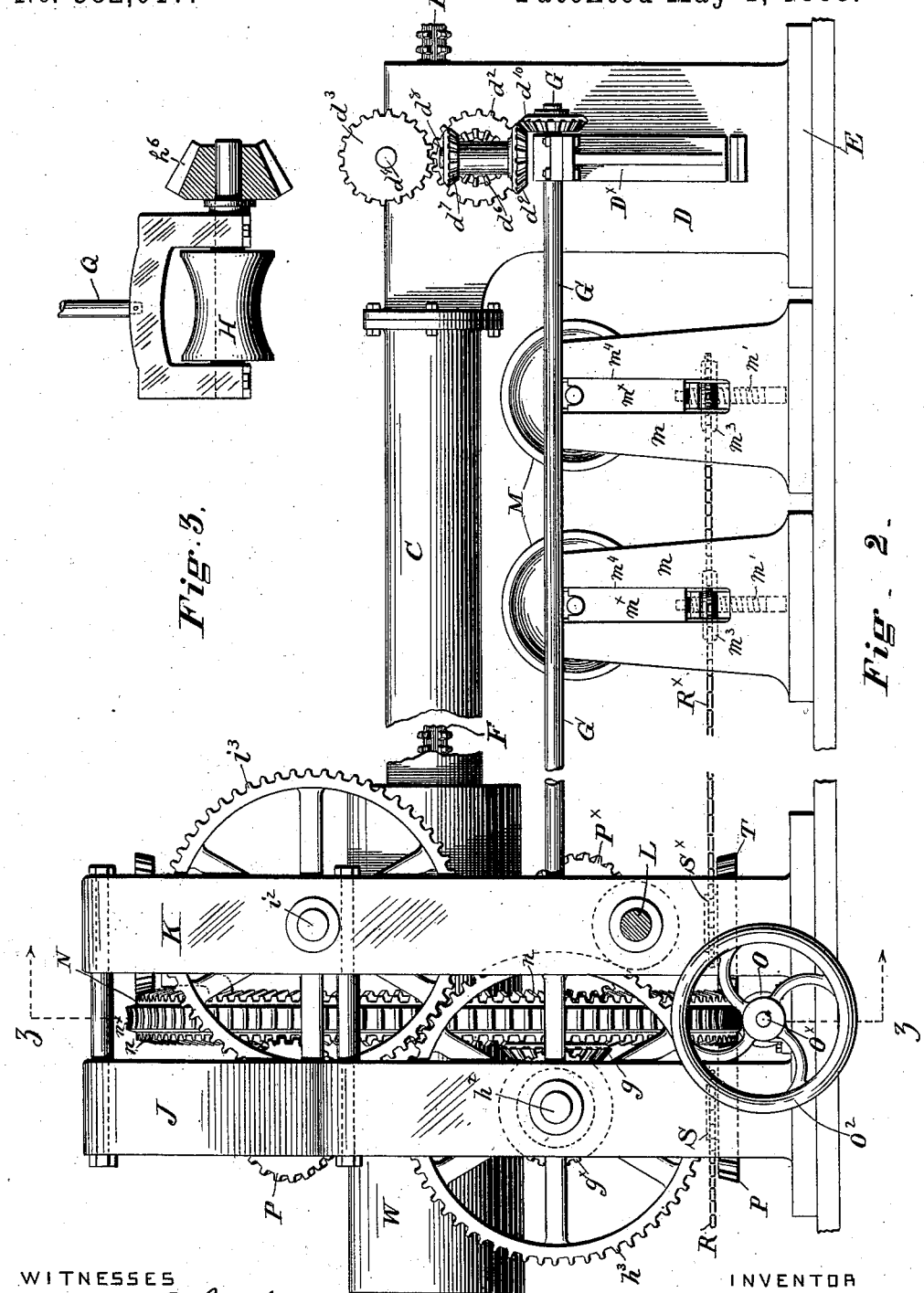
WITNESSES
R. B. Shepherd.
F. Norman Dixon.
INVENTOR
Stephen P. M. Tasker
By his Attorneys, W. C. Strawbridge
H. Bonsall Taylor

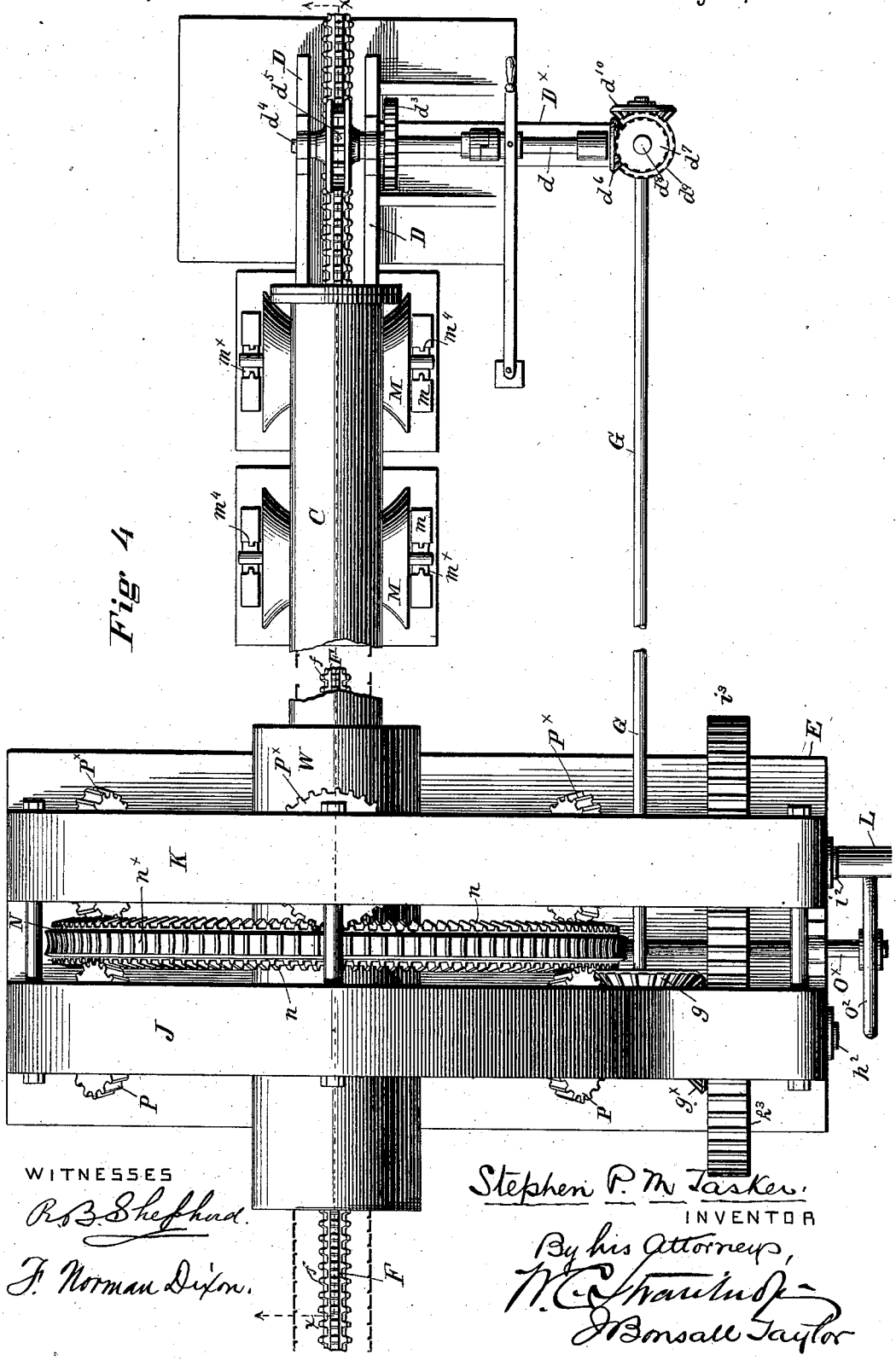

(No Model.) 6 Sheets—Sheet 4.
S. P. M. TASKER.
ROLLING MILL FOR MAKING TUBES.
No. 382,017. Patented May 1, 1888.

WITNESSES
R. B. Shepherd
F. Norman Dixon.

Stephen P. M. Tasker
INVENTOR
By his Attorneys,
W. C. Strawbridge
J. Bonsall Taylor.

(No Model.) 6 Sheets—Sheet 5.
S. P. M. TASKER.
ROLLING MILL FOR MAKING TUBES.

No. 382,017. Patented May 1, 1888.

WITNESSES.
Rob B. Shiphard.
F. Norman Dixon.

Stephen P. M. Tasker
INVENTOR
By his Attorneys,
W. C. Strawbridge.
J. Bonsall Taylor.

(No Model.) 6 Sheets—Sheet 6.

S. P. M. TASKER.
ROLLING MILL FOR MAKING TUBES.

No. 382,017. Patented May 1, 1888.

WITNESSES
R. B. Shepherd
F. Norman Dixon

Stephen P. M. Tasker,
INVENTOR
By his Attorneys,
W. C. Strawbridge
J. Bonsall Taylor.

N. PETERS. Photo-Lithographer, Washington, D. C.

UNITED STATES PATENT OFFICE.

STEPHEN P. M. TASKER, OF PHILADELPHIA, PENNSYLVANIA.

ROLLING-MILL FOR MAKING TUBES.

SPECIFICATION forming part of Letters Patent No. 382,017, dated May 1, 1888.

Application filed November 14, 1887. Serial No. 255,108. (No model.)

*To all whom it may concern:*

Be it known that I, STEPHEN P. M. TASKER, a citizen of the United States, residing in the city and county of Philadelphia, in the State of Pennsylvania, have invented certain Improvements in Rolling Mills for Making Tubes from Hollow Metal Ingots, of which the following is a specification.

The object of my invention, broadly stated, is the manufacture of a tube from a hollow cylindriform metal ingot (preferably a steel cast ingot) by the simultaneous subjection of the external surfaces of said ingot (either hot or cold) to the action of external compressing rolls, and of the internal surfaces of said ingot to the action of positively driven rolls which subserve also the office of a ball or mandrel proper,—the result of the said subjection being not only the positive feeding of the ingot through the rolling mill constituted by the rolls referred to, but the compacting, consolidation, thinning, and reduction of the substance of the walls of the ingot and its consequent extension or increase in length.

Broadly stated, my invention comprehends the employment, in an organized machine for producing tubes from hollow cylindriform ingots, of a roller mandrel the rolls of which are positively driven, in combination with a set of external compressing rolls co-operating with the rolls of the mandrel.

It further comprehends the employment of a series of roller mandrels of the foregoing character, in combination with a series of sets of external compressing rolls respectively operative in connection with given mandrels, when the arrangement is such that the rolls of a given mandrel and those of a corresponding set of external compressing rolls are set in alternation, interdisposed, or staggered, so to speak, with respect to the corresponding rolls of an adjacent mandrel and its set of external compressing rolls.

It further comprehends the provision in a machine of the foregoing organization of driving gearing for at will positively driving the rolls of a set or sets of external compressing rolls, but it does not exclude the employment of external compressing rolls which are idlers driven by the friction of the ingot under passage.

It further comprehends the provision of suitable mechanism for simultaneously advancing toward a common center all of the rolls composing a given set or sets of external compressing rolls; and it, finally, comprehends the provision of suitable devices for supporting and feeding the ingot to and from the mandrels and their associated compressing rolls.

It may be premised that after the first pass the external compressing rolls chiefly effect the consolidation and extension of the ingot by compression of the substance of its external walls, and that the rolls of the mandrel or mandrels co-operate therewith by supporting the substance of the internal walls or bore of the ingot against the compressing thrust of said external rolls, and in driving or feeding it along, but do not in themselves after said first pass further compress the substance of the ingot. It is proper also to state that, although the inventor of the same, I do not herein claim or seek to cover a roller mandrel the rolls of which are positively driven,—such a mandrel being the subject matter of an application for patent executed by me the 8th day of November, A. D. 1887, and filed in the United States Patent Office upon the 9th day of November A. D. 1887.

Machinery embodying a good form of my invention is represented in the accompanying drawings and described in this specification, the particular subject matter claimed as novel being hereinafter definitely specified.

Figure 5:
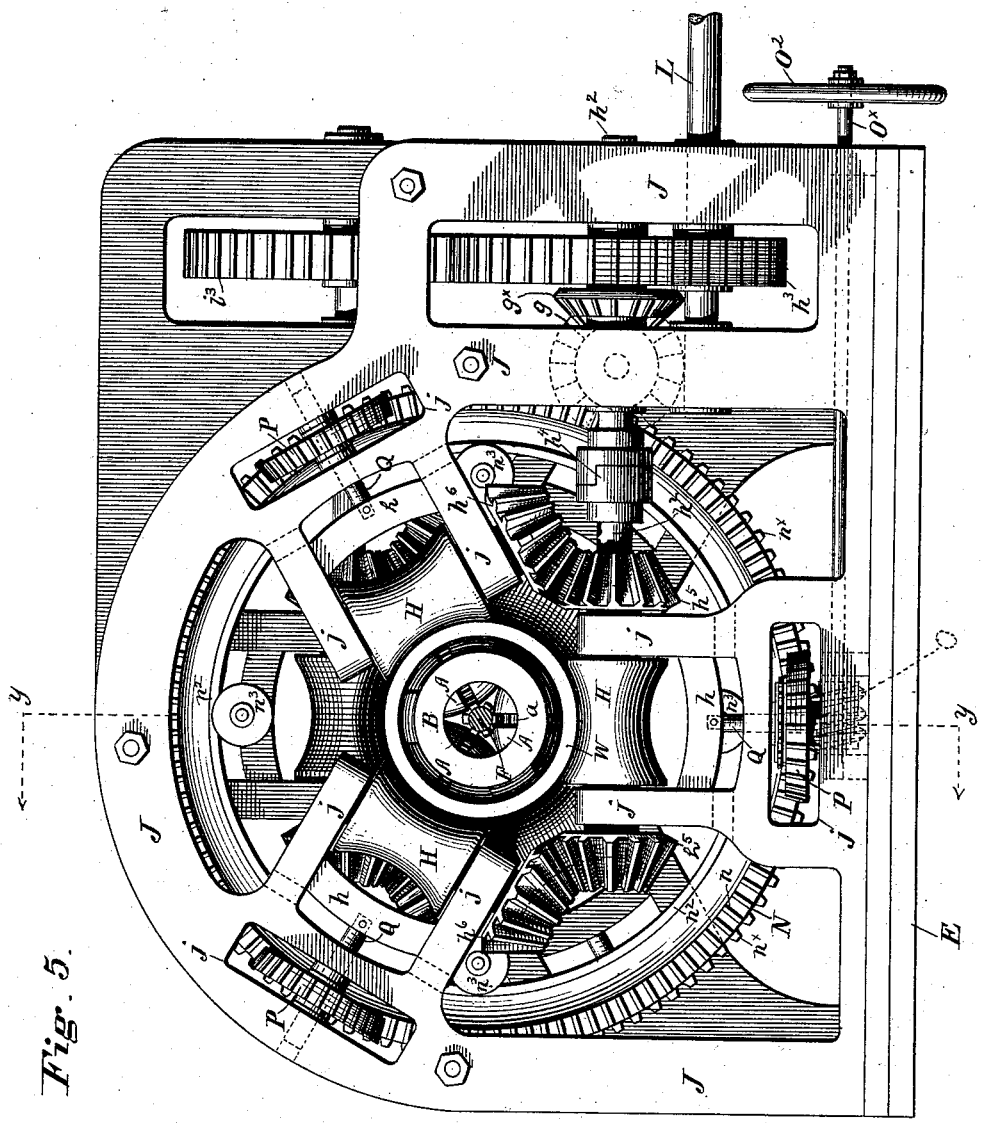
Figure 6:
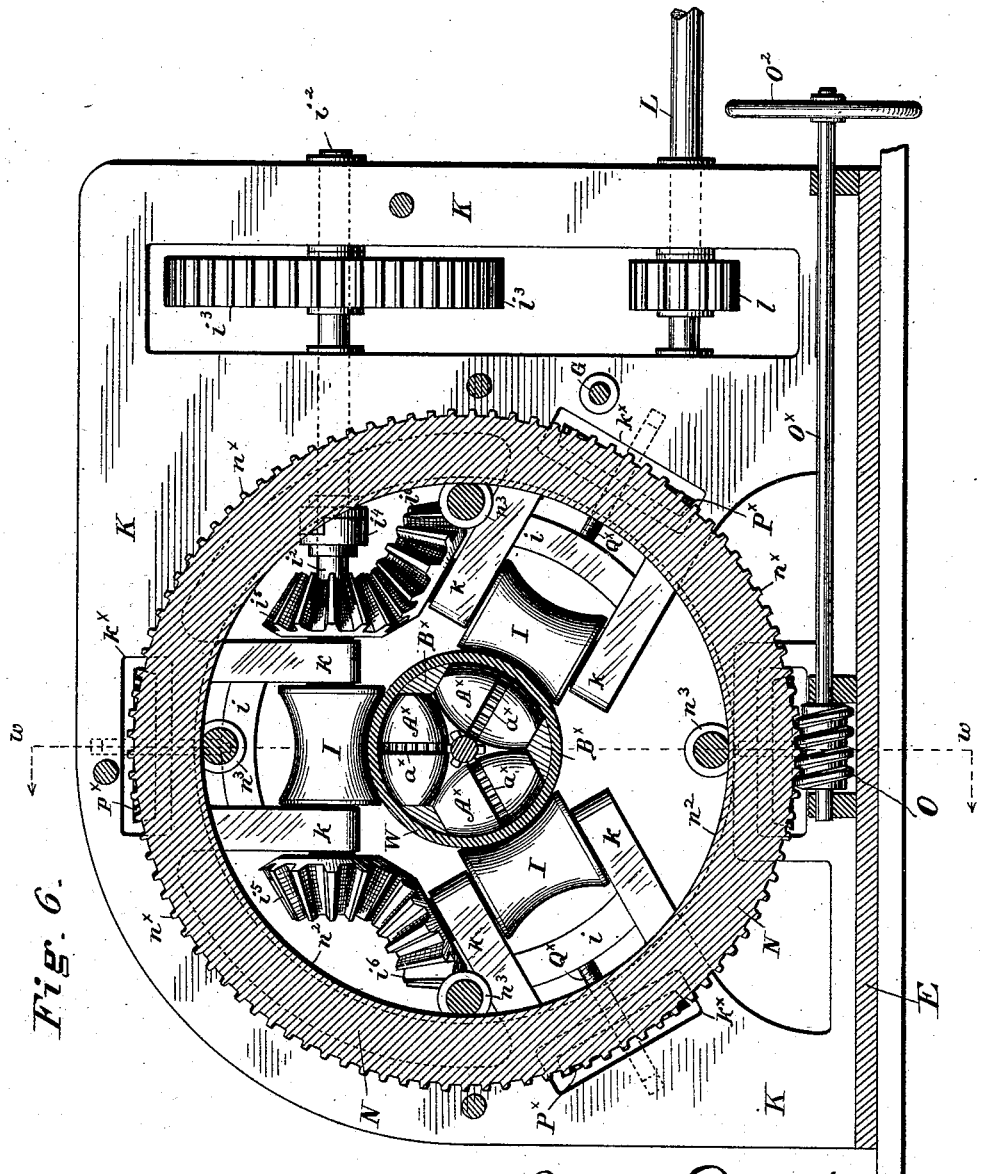
Figure 8:
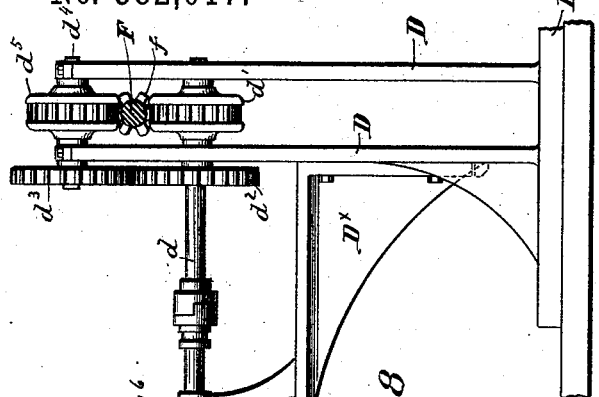
Figure 11:
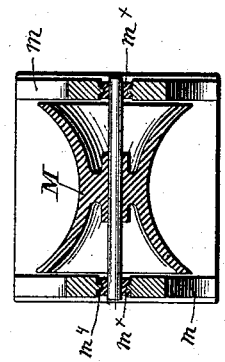
Figure 7:
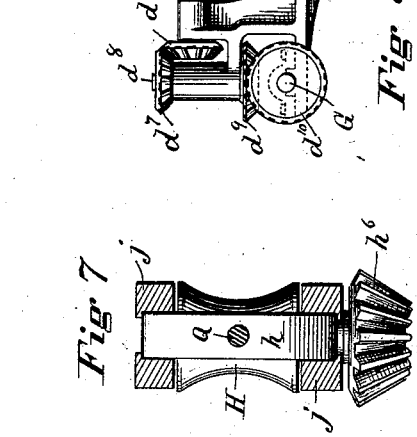
Figure 10:
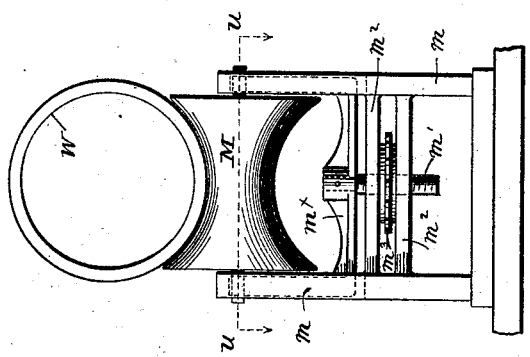
Figure 12:
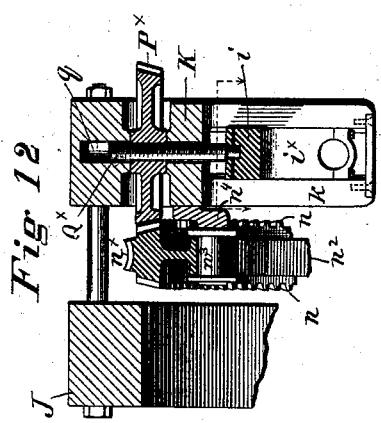
Figure 9:
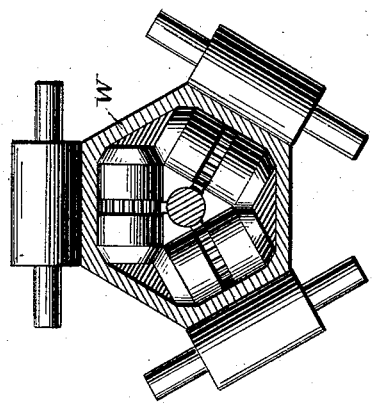
Figure 15:
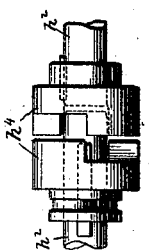

In the drawings, Figure 1 is a central, vertical, longitudinal, side sectional elevation in the planes of the dotted lines $x$–$x$ of Fig. 4, $y$–$y$ of Fig. 5, and $w$–$w$ of Fig. 6, of the entire machine the mandrel head and rod being shown in elevation. Fig. 2 is a side elevation of the said machine. Fig. 3 is an elevational detail of one of the external compressing rolls and its supporting roll frame removed from its frame way. Fig. 4 is a top plan view of the machine represented in Figs. 1 and 2. Fig. 5 is a left hand end elevation of the machine represented in Figs. 1 and 2. Fig. 6 is a transverse sectional elevation through the said machine in the plane of the dotted line $z$–$z$ of Fig. 2. Fig. 7 is a fragmentary plan view of one of the roll frames for carrying a compressing roll, the slotted frame ways in which said roll frame is set for movement being shown in section. Fig. 8 is a right hand end elevational view of the gearing shown in Figs. 1, 3 and 4, which constitutes a prime mover for the mandrel rack. Fig. 9 is a diagram illustrative of the application of my invention to machinery for rolling a hexagonal tube. Fig. 10 is an end elevational view of one of the roll standards and idler carrying rolls for supporting the ingot. Fig. 11 is a sectional plan of the same in the plane of the dotted line $u$–$u$ upon said Fig. 10. Fig. 12 is a fragmentary sectional detail through a portion of the standing frames, adjusting ring, a roll frame, and an adjusting wheel. Fig. 13 is a fragmentary sectional elevation of one of the divided roll shafts in the region of its clutch.

Similar letters of reference indicate corresponding parts.

The machine represented in the foregoing drawings is one which is provided with a double roller mandrel, that is to say with two roller mandrels in the same longitudinal line, and each having three positively driven rolls respectively by mandrels staggered or alternated as shown, and which is also provided with two sets of external compressing rolls operating respectively in conjunction with the rolls of the respective mandrels and, as in the case of said last mentioned rolls, respectively by sets staggered or alternated as shown.

I illustrate and hereinafter describe the foregoing machine because it is one well adapted to effectuate my invention, but I wish it to be understood that my invention comprehends mechanisms of other and different organizations. Thus, for example, instead of employing two mandrels and two sets of compressing rolls, but one mandrel and one set of compressing rolls, or more than two mandrels and a correspondingly increased number of sets of compressing rolls, may be employed. Thus also, instead of employing three rolls in each mandrel, and three external compressing rolls in each set,—but two, or more than three rolls may be used in each mandrel and, correspondingly, but two or more than three rolls used in each set of external rolls.

As the mandrel employed is an essential member of the organization embodying my present invention, and notwithstanding that it *per se*, as stated, constitutes the subject matter of a separate application,—it is important for me to describe it, in order that this machine in its entirety may be understood.

The mandrel employed relates to a class of mandrels in which the head, ball or mandrel proper, is provided with two, three, four, five, or more, usually ellipsoidal friction rolls mounted in bearings in a stock or case, and adapted to be introduced within the tube to be rolled.

Types of mandrels of the foregoing class, which are of my invention, are to be found in United States Letters Patent No. 151,323, dated May 26, 1874; and No. 331,570, No. 331,573, and No. 331,578, all dated December 1, 1885,— to which Letters Patent reference is to be made for the better understanding of my present improvements.

The intention of the employment of mandrels of the foregoing class, it may be premised, is to obviate friction between the interior surfaces of the tube and the ball of the ordinary mandrel, and to permit of the more ready passage of the tube over the mandrel, and withdrawal of the mandrel from the tube.

The object of my improvement in roller mandrels set forth in my application for patent referred to, is to provide means for positively driving mandrel rolls so as to render them no longer idler rolls the movement of which is wholly due to the movement of the tube upon them, but positively driven rolls which move under the thrust or impulse of suitable actuating devices with a positive rotative motion which is the same as, or greater, or less, than, that of the tube operated upon.

To such end my said invention referred to, broadly stated, comprehends the provision in connection with the rolls of a roller mandrel of driving gearing of any preferred character,— and substantially, for instance, of any such character as is represented in the accompanying drawings of this application and hereinafter referred to,—which is disposed between the mandrel rolls with which it is engaged, and a prime mover of any preferred character with which it is also engaged, and which receives its movement from said prime mover and transmits it to said rolls,—the arrangement as an entirety being substantially such that the connective gearing, be its specific mechanical character what it may, operatively unites the prime mover and the mandrel rolls and imparts to said rolls a positive movement transmitted direct from said prime mover.

Such being the general character of my invention referred to, it is apparent that the form of the gearing intermediate between the prime mover and the driven rolls may structurally vary and assume the form of many well known mechanical movements, and that the prime mover may likewise vary and be a motor of any suitable character.

In the double mandrel represented in the drawings, A A A represent the three mandrel rolls which are contained and journaled in the first mandrel head B, and $A^\times A^\times A^\times$ the three mandrel rolls which are contained and journaled in the second mandrel head $B^\times$. The two mandrel heads are both secured together in alignment as shown, and carried upon the extremity of the mandrel rod C, supported from and by a mandrel standard D, erected from the bed plate E. The rolls of both mandrel heads are respectively centrally circumscribed by sunken teeth $a\ a^\times$, and the driving gearing of, and which is common to, both sets of rolls is constituted by a rack F having six independent lines or series of teeth $f$, adapted by lines respectively to engage with the respective series of sunken teeth upon the respective mandrel rolls.

A convenient prime mover for occasioning the thrust of the aforesaid rack in either direction, is the following: The mandrel standard D is provided with a standard bracket $D^x$, which, in connection with said standard, presents bearings for a prime mover shaft $d$ the inner extremity of which is equipped with a rack pinion $d'$ engaged with the rack, and is also equipped with a spur wheel $d^2$ engaged with a counter spur wheel $d^3$ upon a pinion shaft $d^4$ which is between its bearings on the mandrel standard provided with a counter pinion $d^5$ also engaged with the rack. At its outer extremity the prime mover shaft $d$ is provided with a bevel pinion $d^6$ which gears with a sister pinion $d^7$ right angular thereto and connected with a minor pinion shaft $d^8$ which below its bearing in the bracket $D^x$ is equipped with a driven bevel pinion $d^9$ engaged with a driving pinion $d^{10}$ on the near extremity of a counter shaft G extending longitudinally of the machine, and at its far extremity equipped with a minor pinion $g$ engaged with a master pinion $g^x$ keyed upon the roll shaft $h^2$, whereof hereinafter, from which the rotation of the counter shaft is derived. It is obvious that the rotation of the counter shaft will, according to its direction, through the intermediate bevel gearing described, occasion the rotation of the prime mover shaft $d$ in one or the other direction, and that said last named shaft will through the spur wheels $d^2$ $d^3$ and the pinions $d'$ $d^5$ occasion the propulsion of the rack in one or the other direction.

While the foregoing contrivances as a connected whole constitute a convenient prime mover for actuating a rack which happens to be the driving gearing employed to occasion the driving of the mandrel rolls, it is obvious that other mechanical contrivances may be substituted for the same purpose. It is also apparent that the thrust of the rack in either direction will occasion the simultaneous and similar rotation of all of the mandrel rolls.

As already explained, the foregoing devices, which essentially compose a roller mandrel having positively driven rolls, driving gearing for the same, and a prime mover for said gearing,—constitute the subject matter of my application for patent referred to, and are not in themselves claimed herein.

The external compressing rolls H H H, being those of the first set operative in conjunction with the rolls A of the first mandrel head, and I I I, being those of the second set operative in conjunction with the rolls of the second mandrel head, are constructed, housed, arranged, and operated in substantially the following manner:

J is a housing or standing frame for supporting the rolls H of the first set.

K is a housing or standing frame for supporting the rolls I of the second set.

The two standing frames or housings are conveniently parallel, erected from the bed plate, fastened stayed or tied together as convenience of manufacture may dictate, and preferably of the form shown in the drawings, that is to say open-centered for the location of the mandrel heads within them and for the passage of the ingot through them. Each of these frames serves to support or carry the external compressing rolls of one of the two sets of rolls, and to such end each of the said frames is preferably of skeleton form, embodies internally radially projecting frame ways, $j, k$, which sustain the roll frames $h$ $i$ which respectively carry the respective compressing rolls H and I.

The roll frames detached are represented in Figs. 3 and 7, and they each consist of a yoke or cross head, to which the letters $h$ $i$ are respectively applied, and of side bars $h^x$ $i^x$ which are formed or provided with any suitable boxings or bearings for the gudgeons or axles of the rolls. In the form of machine represented, one (the lower in the first set and the upper in the second set) of the rolls of each set of rolls is mounted horizontally, while its two neighbors in the same set are mounted obliquely at its sides as shown in Figs. 5 and 6 of the drawings. The gudgeons of the lower roll H of the first set are constituted by a roll shaft $h^2$, and similarly the gudgeons of the upper roll I of the second set are constituted by a roll shaft $i^2$. Each of these roll shafts is horizontal and the two shafts are parallel. These shafts as shown in Figs. 3, 4, 5, and 6, are extended through suitable bearings in the roll frames to the right hand thereof, and are equipped respectively with roll shaft spur wheels $h^3$ $i^3$ which engage with each other as best shown in Fig. 3. Each of these roll shafts is conveniently a divided shaft (or, so considered, two shafts) provided respectively in the region of their division with clutches $h^4$ $i^4$ of any preferred character, preferably one fixed and one sliding as shown in Fig. 13, which, according as they are respectively in bite or out of bite with each other, render the divisional members of the shafts to which they are respectively applied integral or capable of receiving throughout their entire length the motion imparted to them by the movement of the spur wheels which they respectively carry,—or else divided, the outer portions to which the spur wheels are applied alone being positively driven by said spur wheels, while the inner portions which carry the compressing rolls are not for the time being driven at all but adapted to run idle within their roll frames.

The inner members of each of the aforesaid divided roll shafts $h^2$ $i^2$ are respectively provided each with a pair of long-leaved bevel pinions $h^5$ $i^5$, Figs. 4 and 5, keyed upon them, each of which pinions of the aforesaid pair of pinions is engaged with a corresponding counter bevel pinion $h^6$ $i^6$ respectively mounted upon the extended gudgeon of that compressing roll which, in either set of rolls, is contiguous or adjacent to the aforesaid bevel pinion $h^5$ or $i^5$, as the case may be.

It is obvious that the application of the foregoing pinions to the respective rolls occasions the positive gearing together of all of the rolls constituting a given set, and that, when the clutches on the divided roll shafts are in bite, rotation imparted to said roll shafts and consequently to the bevel pinions and compressing rolls which these shafts respectively carry, is also, through the counter bevel pinions, imparted to each of the other two pair of rolls which respectively complete the respective sets. It is, moreover, obvious from consideration of the gearing aforesaid that the positive rotation imparted to all of the compressing rolls is in the same direction as to all of said rolls.

The foregoing gearing, considered as a connected whole, is simply a type of driving gearing well adapted to actuate to a positive common rotation all of the rolls of the sets of rolls employed, but it is obvious that other driving gearings operative to the same result would constitute the mechanical equivalent of the gearing specified.

Any prime mover may be employed to impart rotation in either direction to the aforesaid driving gearing of the compressing rolls. I prefer to employ as a convenient prime mover a motor shaft L, Figs. 3, 5, and 6, conveniently housed in the standing frame K, to which rotation in either direction is by any preferred means imparted, and which is provided with a motor pinion $l$ set to engage the roll shaft spur wheel $h^3$ or that spur wheel which drives the roll shaft $h^2$ of the first set of external compressing rolls, H. Instead, however, of the foregoing, which is recommended for its simplicity, other forms of prime mover may be employed.

It will now be apparent that the bevel gearing $g$ $g^\times$ respectively connecting the roll shaft $h^2$ and the counter shaft G, is operative, through the intermediation of the prime mover for actuating the driving gearing of the rolls of the mandrel, to occasion a positive connection between the gearing for driving the external compressing rolls and the driving gearing of the rolls of the mandrel,—and that therefore the motor shaft L and its motor pinion $l$ constitute not only a prime mover for the gearing which, when the clutches throw it in action, drives the compressing rolls, but also a master prime mover for, through the intermediary prime mover and gearing described, actuating the rolls of the mandrel. It is now to be understood that, although the positive connected driving of the compressing rolls is that mode of operation which I prefer to employ,—yet that such driving may be dispensed with, the mandrel rolls alone being positively driven, and that, in such employment, the bevel and counter bevel pinions of the compressing rolls, while in fact idlers, to be dispensed with if desired, yet, when retained, constitute a positive connection between the rolls of each set and serve to secure uniformity in their movement.

In practice I prefer that the working belly of each compressing roll should be struck upon a radius slightly greater than the radius of the working face of the corresponding roll of the mandrel, and consequently upon a radius slightly greater than that of the exterior of the ingot intended to be reduced, and this because it is of advantage that the greater part of the work should be performed by the central portion of the belly of the compressing rolls, and because such shape allows the surfaces of the ingot near the ends of the compressing rolls to slip laterally to some extent whereby buckling is avoided.

The extremities of the compressing rolls are, as shown, preferably edged-off, rounded, or flattened into a practically cylindric continuation of the rolls, and this is done to prevent the edges of the rolls, if sharp, from embedding themselves in the ingot and making marks difficult of obliteration.

In the practice of the manufacture which my invention is designed to effectuate, it is usually necessary to cause the ingot to pass more than once, and first in one direction and then in the other, through the rolls,—and to this end it is important to provide, upon each side of the rolling mill proper, suitable devices for carrying and supporting the ingot, and also to provide convenient means for, after each pass, setting up toward a common center and to a predetermined extent, all of the rolls which constitute the respective sets of compressing rolls.

The foregoing objects I conveniently carry out by the following contrivances, which are simply typical of many others equally well adapted to subserve the purpose:—

M are a series of idler carrying rolls,—any desired number of which may be arranged in the line of the pass of the ingot on each side of the rolling mill proper. Each of these rolls is supported upon a roll standard $m$ of any preferred character, and such, for instance, as that represented in Figs. 10 and 11 of the drawings, and is journaled in a yoke $m^\times$ adapted to the standards or to ways $m^4$ formed therein. The yoke of each carrying roll is fixedly provided with a depending lifting screw $m'$ passing freely vertically downward through orifices in parallel horizontal cross webs $m^2$ being parts of the standard, between which webs is housed against up or down play a driven sprocket wheel $m^3$ axially threaded upon the lifting screw $m'$ in connection with which it operates. It is apparent that when said driven sprocket wheel is rotated,—the webs between which it is housed resisting vertical thrust,—it will, according to the direction of its rotation, occasion the raising or the lowering of the lifting screw and its connected yoke and carrying roll.

In the drawings I have shown but two carrying rolls disposed upon the mandrel end of the mill. It is to be understood, however, that some such rolls are to be applied at both ends of the machine, and that the number employed is to be such as to permit of the convenient handling of ingots and tubes of considerable length.

The below described devices constitute a convenient means for effectuating the common adjustment toward a common center of the rolls constituting the sets of external compressing rolls. They are not, of course, the only means which may be employed, but they are effectual for the purpose and inexpensive. They are these:—

N is what I term an adjusting ring, it being an annular body provided with a peripheral series of worm teeth $n^\times$, and with rack teeth $n$ in circular series upon each of its side faces. The ring is also, but for convenience merely, provided with an internal circular track $n^2$, by means of which it the said ring is mounted and rides upon flanged carrying rollers $n^3$ suitably supported in any preferred manner, as, for instance, by means of brackets $n^4$ as represented in Fig. 1, from the standing frames. The adjusting ring, being so, as aforesaid, mounted for rotatory movement with respect to its carrying rollers, is, at will, actuated to such movement by a worm O, Fig. 6, housed in suitable bearings erected from the framing, and mounted upon a worm shaft $O^\times$ provided with a hand wheel $O^2$ for imparting to it, and consequently to the worm, rotation.

Each of the housings or standing frames, J, K, is radially to the outside of or beyond its frame ways, and in line therewith, formed with slots or openings respectively as to said frames designated $j^\times$ and $k^\times$, and in each of these slots is snugly housed a toothed adjusting wheel P $P^\times$, the wheels P being those in the first standing frame J and the wheels $P^\times$ those in the second K. All of these adjusting wheels are axially threaded and mounted upon radial adjusting screws respectively designated Q $Q^\times$, and housed free for endwise movement in screw ways correspondingly designated $q$ $q^\times$. At their inner extremities the adjusting screws are respectively fixedly connected with the roll frames, as shown in Figs. 1, 5, 7, and 12. Inasmuch as each of the adjusting wheels is accurately fitted against radial play within its slot, it is apparent that rotation imparted to said wheels will, through the adjusting screws in connection with which they operate and according to the direction of such rotation, impart an inward or outward radial movement to the roll frames with which said screws are connected and consequently to the external compressing rolls with which said frames are equipped.

The rotation of the adjusting wheels is accomplished by movement imparted to the adjusting ring N, the rack teeth $n$ on its sides respectively engaging with the several adjusting wheels P and $P^\times$, as clearly shown in the drawings. It will now be understood how, after a given pass of the ingot in either direction has been made, the external compressing rolls may be, by a simple turn of the hand wheel $O^2$, together set up a sufficient distance to exert upon the ingot, upon its next return or reverse pass, a further compressing action.

In order to, simultaneously with the setting-up of the external compressing rolls, elevate to a predetermined extent the idler carrying rolls so as to adapt them to properly present or level and support the ingot for the next pass after it has lost diameter by such reduction as is occasioned by any given pass,—I gear the said rolls together by the employment of sprocket chains R $R^\times$ which not only engage the driven sprocket wheels $m^3$ located in the standards of the carrying rolls but also driving sprocket wheels S $S^\times$, of which S, which is that driving the chain R, is directly connected with the lowermost adjusting wheel P of the lowermost roll of the standing frame J, and of which $S^\times$, which is that directly connected with the chain $R^\times$, is connected with a supplemental adjusting wheel T, housed in the lower portion of the second standing frame K upon a fixed gudgeon $t$ secured in said frame.

It is of course apparent that while the foregoing is a convenient contrivance for simultaneously adjusting both the external compressing rolls and the idler carrying rolls, other mechanical contrivances may be substituted in its stead. The devices described are simply a convenient connecting gearing for the purpose.

In Fig. 9 I have represented an arrangement to which resort may be had for the purpose of rolling hexagonal tubes. Three external compressing rolls of cylindrical contour and of length equal to the breadth of the facets of the hexagon are applied respectively to the three alternate sides of the hexagon, and with them is used a positively operated roller mandrel which presents its three conico-cylindric operating rollers to the inner faces of the same sides of the ingot as the external rolls are operating upon. As is obvious, upon a second pass the three sides of the ingot which are not operated upon in the first pass will be upon its rotation presented to the rolls. I have deemed it unnecessary to represent in connection with these rolls the connected mechanism necessary to drive them, but it will be understood that the said rolls may be operated by machinery of the same general character as that illustrated and described in connection with the other various forms of rolls. And also understood that by corresponding modifications of the rolls tubes of other sectional outline may be produced.

In all of the drawings the ingot is designated by the letter W.

Having now described a good form of apparatus embodying my invention, it is proper to state that all gearing for driving the external compressing rolls may be dispensed with and such rolls be simply idler rolls; and proper also to state that, while I prefer to use three external compressing rolls to the set, and two sets the respective rolls of which are interdisposed, because by such arrangement I secure an equal circumferential pressure upon all portions of the ingot and at the same time secure sufficient room between the rolls to afford good bearings for their axles, yet that but one set of rolls may be employed, and the tube after each pass be turned to a sufficient extent to, upon the second pass, present the surfaces not in the first instance subjected to the action of the rolls, to be rolled; and, moreover, to state that instead of causing the ingot to travel backward and forward through given sets of rolls, a sufficient number of additional sets may be employed to compass the requisite reduction at a single pass.

Having thus described my invention, I claim:—

1. In a rolling mill, the combination of a roller mandrel having two or more mandrel rolls, gearing for positively driving said rolls, a prime mover for actuating said gearing, and external compressing rolls, substantially as set forth.

2. In a rolling mill, the combination of a roller mandrel having two or more mandrel rolls, gearing for positively driving said rolls, a prime mover for actuating said gearing, external compressing rolls, gearing for positively driving said compressing rolls, and a prime mover for actuating said gearing, substantially as set forth.

3. In a rolling mill, the combination of a roller mandrel having two or more mandrel rolls, gearing for positively driving said rolls, a prime mover for actuating said gearing, external compressing rolls, and adjusting gearing for simultaneously setting up toward a common center all of the external compressing rolls, substantially as set forth.

4. In a rolling mill, the combination of a roller mandrel having two or more mandrel rolls, gearing for positively driving said rolls, a prime mover for actuating said gearing, external compressing rolls, gearing for positively driving said compressing rolls, a prime mover for actuating said gearing, and adjusting gearing for simultaneously setting up toward a common center all of the external compressing rolls, substantially as set forth.

5. In a rolling mill, the combination of a roller mandrel having two or more mandrel rolls, gearing for positively driving said rolls, a prime mover for actuating said gearing, external compressing rolls, and idler carrying rolls for carrying and supporting the ingot, substantially as set forth.

6. In a rolling mill, the combination of a roller mandrel having two or more mandrel rolls, gearing for positively driving said rolls, a prime mover for actuating said gearing, external compressing rolls, adjusting gearing for simultaneously setting up toward a common center all of the external compressing rolls, idler carrying rolls for carrying and supporting the ingot, and adjusting gearing for adjusting the vertical set of said carrying rolls, substantially as and for the purposes set forth.

7. In a rolling mill, the combination of a roller mandrel having two or more mandrel rolls, gearing for positively driving said rolls, a prime mover for actuating said gearing, external compressing rolls, gearing for positively driving said compressing rolls, a prime mover for actuating said gearing, adjusting gearing for simultaneously setting up toward a common center all of the external compressing rolls, idler carrying rolls for carrying and supporting the ingot, and adjusting gearing for adjusting the vertical set of said carrying rolls, substantially as and for the purposes set forth.

8. In a rolling mill, the combination of a series of roller mandrels each containing two or more rolls, the rolls of said respective mandrels being alternated or interdisposed as set forth,—gearing common to the rolls of all of the mandrels for positively driving said rolls,— a prime mover for actuating said gearing,— and a series of sets of external compressing rolls corresponding in number with the mandrels, the rolls of said respective sets being alternated or interdisposed as set forth and operating respectively in connection with corresponding rolls of corresponding mandrels, substantially as set forth.

9. In a rolling mill, the combination of a series of roller mandrels each containing two or more rolls, the rolls of said respective mandrels being alternated or interdisposed as set forth,—gearing common to the rolls of all of the mandrels for positively driving said rolls,— a prime mover for actuating said gearing,—a series of sets of external compressing rolls corresponding with the number of mandrels, the rolls of said respective sets being alternated or interdisposed as set forth and operating respectively in connection with corresponding rolls of corresponding mandrels,—gearing for positively driving said compressing rolls,— and a prime mover for actuating said gearing,—substantially as set forth.

10. In a rolling mill, the combination of a series of roller mandrels each containing two or more rolls, the rolls of said respective mandrels being alternated or interdisposed as set forth,—gearing common to the rolls of all of the mandrels for positively driving said rolls,— a prime mover for actuating said gearing,—a series of sets of external compressing rolls corresponding with the number of mandrels,— the rolls of said respective sets being alternated or interdisposed as set forth and operating respectively in connection with corresponding rolls of corresponding mandrels,— and adjusting gearing for simultaneously setting up toward a common center all of the compressing rolls of all of the sets,—substantially as set forth.

11. In a rolling mill, the combination of a series of roller mandrels each containing two or more rolls, the rolls of said respective mandrels being alternated or interdisposed as set forth,—gearing common to the rolls of all of the mandrels for positively driving said rolls,— a prime mover for actuating said gearing,—a series of sets of external compressing rolls corresponding with the number of mandrels; the rolls of said respective sets being alternated or interdisposed as set forth and operating respectively in connection with corresponding rolls of corresponding mandrels,—gearing for positively driving said compressing rolls,—a prime mover for actuating said gearing,—and adjusting gearing for simultaneously setting up toward a common center all of the compressing rolls of all of the sets,—substantially as set forth.

12. In a rolling mill, the combination of a series of roller mandrels each containing two or more rolls, the rolls of said respective mandrels being alternated or interdisposed as set forth,—gearing common to the rolls of all of the mandrels for positively driving said rolls,—a prime mover for actuating said gearing,—a series of sets of external compressing rolls corresponding with the number of mandrels, the rolls of said respective sets being alternated or interdisposed as set forth and operating respectively in connection with corresponding rolls of corresponding mandrels,—and idler carrying rolls for carrying and supporting the ingots,—substantially as set forth.

13. In a rolling mill, the combination of a series of roller mandrels each containing two or more rolls, the rolls of said respective mandrels being alternated or interdisposed as set forth,—gearing common to the rolls of all of the mandrels for positively driving said rolls,—a prime mover for actuating said gearing,—a series of sets of external compressing rolls corresponding with the number of mandrels, the rolls of said respective sets being alternated or interdisposed as set forth and operating in connection with corresponding rolls of corresponding mandrels,—adjusting gearing for simultaneously setting up toward a common center all of the external compressing rolls,—idler carrying rolls for carrying and supporting the ingot,—and adjusting gearing for adjusting the vertical set of said carrying rolls, substantially as set forth.

14. In a rolling mill, the combination of a series of roller mandrels each containing two or more rolls, the rolls of said respective mandrels being alternated or interdisposed as set forth,—gearing common to the rolls of all of the mandrels for positively driving said rolls,—a prime mover for actuating said gearing,—a series of sets of external compressing rolls corresponding with the number of mandrels, the rolls of said respective sets being alternated or interdisposed as set forth and operating in connection with corresponding rolls of corresponding mandrels,—gearing for positively driving the sets of external compressing rolls,—a prime mover for actuating said gearing,—adjusting gearing for simultaneously setting up toward a common center all of the external compressing rolls,—idler carrying rolls for carrying and supporting the ingot,—and adjusting gearing for adjusting the vertical set of said carrying rolls, substantially as set forth.

In testimony whereof I have hereunto signed my name this 10th day of November, A. D. 1887.

STEPHEN P. M. TASKER.

In presence of—
J. BONSALL TAYLOR,
WM. C. STRAWBRIDGE.